3,646,116
DIRECT PRODUCTION OF ESTERS FROM ETHYLENE AND METHANOL

James D. McClure, Oakland, and Lynn H. Slaugh, Lafayette, Calif., assignors to Shell Oil Company, New York, N.Y.
No Drawing. Filed Dec. 12, 1969, Ser. No. 884,719
Int. Cl. C07c 69/24
U.S. Cl. 260—497 A
8 Claims

ABSTRACT OF THE DISCLOSURE

Methyl esters of linear saturated aliphatic acids are prepared in a single step process from ethylene and methanol.

BACKGROUND OF THE INVENTION

This invention relates to the production of esters from ethylene and methanol. The invention relates more particularly to the production of methyl esters of linear alkanoic acids of 3, 5, and 7 carbons by carbomethoxylation of ethylene and ethylene growth products in the presence of ruthenium-containing phosphine complex catalyst.

Processes for ethylene growth and carbonylation processes employing ruthenium-containing phosphine complex catalysts individually are both known in the art. It is known that ethylene will form dimers, trimers, etc. in the presence of certain catalysts and that functionalization of these growth products can then be effected in a second reaction zone. It is also known that trihydrocarbylphosphine carbonyl complexes of ruthenium catalyze the addition of carbon monoxide to olefins to give aldehydes and alcohols.

No process is known, however, for producing valuable methyl esters of saturated carboxylic acids directly from such inexpensive starting materials as ethylene and methanol.

STATEMENT OF THE INVENTION

It has now been found that esters are produced in the single step process of contacting ethylene with methanol at a temperature of from about 175° C. to about 250° C. in the presence of a catalyst consisting essentially of ruthenium in complex combination with carbon monoxide and triaryl phosphine ligand. The process is characterized by a substantial absence of carbon monoxide in the reaction zone. The ester products are characterized as methyl esters of predominantly normal saturated carboxylic acids of 3, 5, or 7 carbons which esters are formed by carbomethoxylation of ethylene or ethylene growth products. The catalyst is characterized as a catalyst which in a single process step both effects a growth reaction with ethylene and functionalizes the resulting growing alkyl chain before the chain eliminates from the catalyst.

DESCRIPTION OF PREFERRED EMBODIMENTS

In a preferred embodiment of the invention ethylene and methanol are contacted in a molar ratio of ethylene to methanol of from about 0.75 to 1 to about 10 to 1 and at a temperature of 175° C. to 250° C. and a total reaction pressure of from about 1000 p.s.i.g. to about 5000 p.s.i.g. in the presence of a complex catalyst. In its active form, the suitable complex catalyst of ruthenium will contain the ruthenium component in a reduced valence state. This will normally be a zero-valence state but may suitably be higher, such as a +1 or +2 valence state.

As used throughout this specification and claims, the term "complex" means a coordination compound formed by the union of one or more electronically rich molecules or atoms capable of independent existence with one or more electronically poor molecules or atoms, each of which is also capable of independent existence.

Suitable catalysts within the scope of those empolyed in the process of the invention include the triarylphosphine ruthenium carbonyl complexes represented by the empirical formula $$(R_3P)_2Ru(CO)_3 \qquad (I)$$

wherein $R_3P$ represents a tertiary phosphine having three groups which are independently aryl. The term aryl, as used throughout this specification and claims, includes both the simply aryls, such as phenyl, and aryls substituted with alkyls, halogens, haloalkyls, or with groups containing oxygen, nitrogen, or sulfur. Aryls which R independently represent very suitably include phenyl, methoxyphenyl and the alkyl- and haloalkylphenyls of from 7 to 9 carbon atoms. Aryls which are preferred in the phosphine ligand include phenyl, p-methoxyphenyl, p-monoalkylphenyls and p-(halomonoalkyl)phenyls of from 7 to 8 carbons such as, for example, p-methylphenyl, p-ethylphenyl, p-(chloromethyl)phenyl, p-(dibromomethyl)phenyl, p-(trichloromethyl)phenyl, p-(trifluoromethyl)phenyl, and p-(fluoroethyl)phenyl. Although each of the three R's independently may be different, it is preferred that all 3 R's in the phosphine be the same. Most preferred phosphine ligands include triphenylphosphine, tri(p-methylphenyl)phosphine, tri(p-methoxyphenyl)phosphine, and tri[p-(trifluoromethyl)phenyl]phosphine.

The invention is not limited by the method of catalyst preparation. In one method, the catalyst is prepared by contacting a suitable phosphine ligand with a solution (preferably non-aqueous) of an organic or inorganic ruthenium salt such as ruthenium chloride or ruthenium octanoate in the presence of carbon monoxide and then reducing the resulting $(R_3P)_2Ru(CO)_2Cl_2$ complex in the presence of carbon monoxide to form $(R_3P)_2Ru(CO)_3$. This material is then separated and added to a methanol/ethylene mixture as catalyst.

Alternatively, the catalysts may be prepared from a carbon monoxide complex of the metal. For example, it is possible to start with a ruthenium carbonyl such as $[Ru(CO)_4]_3$ and by heating this substance with a suitable phosphine ligand of the type previously described, the ligand will replace two or more of the carbon monoxide molecules, producing the desired catalyst. This preparation may be carried out in situ in the reaction zone.

In accordance with the invention, ethylene and methanol are intimately contacted in liquid phase in the presence of the above-defined catalysts comprising a complex of ruthenium with a triaryl phosphine ligand and carbon monoxide at well defined conditions of temperature and pressure to form methyl esters of saturated carboxylic esters. Depending on the exact catalyst and reaction conditions employed the products formed by the process of the invention comprise the methyl esters of saturated carboxylic acids, methyl propionate (70–85% selectivity), methyl n-pentanoate (4–10%) and methyl n-heptanoate (1–2%) with diethyl ketone (1–4%), butenes (2–8%) and ethane (95%). Several other products are formed in trace (<1%) amounts including butane, hexenes, methyl formate, methyl-2-methyl butyrate (0.3%) and two unknown high boiling compounds. The fact that the $C_5$ ester formed is almost exclusively methyl n-pentanoate (92–97%) indicates that this linear ester arises principally by ethylene growth followed by carbomethoxylation rather than by carbomethoxylation of ethylene dimer, 1-butene. The reaction is therefore the single reaction $$(n + 2)CH_2{=}CH_2 + 2CH_3OH \longrightarrow$$

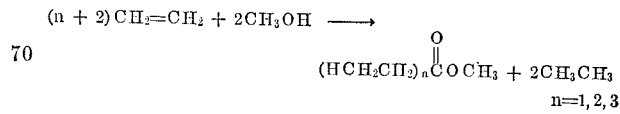

$n=1,2,3$ rather than the sequence of two reactions which experimentally gives a mixture of branched and straight chain products:

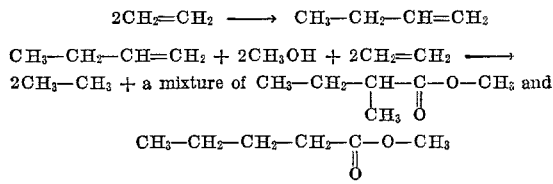

Pressures employed preferably range from about 1500 p.s.i.g. to about 4000 p.s.i.g. The actual pressure employed may depend in part on the relative proportions of ethylene and methanol employed, larger amounts of ethylene leading to higher total reaction pressures. It is suitable, if desired, to add various inert diluent gases such as nitrogen and the like to the reaction zone. It is essential to prevent substantial additions of carbon monoxide. Unlike other ruthenium-phosphine catalyzed processes which advantageously employ carbon monoxide in the reaction zone, the process of the invention is seriously inhibited by carbon monoxide. Carbon monoxide in the reaction zone should be limited to at most less than about 10% (preferably less than 2%) of the total ethylene present.

The molar ratio of ethylene to methanol is preferably chosen in the range of from about 1.0 to 1 to about 7.5 to 1. At lower ratios, such as from about 1.0 to 1 to about 2 to 1 the proportion of methyl propionate is maximized and the proportion of higher growth products such as methyl n-pentanoate is minimized. At higher ethylene to carbon monoxide ratios, such as from 4 to 1 to about 7.5 to 1, the proportion of growth products is maximized.

The ratio of ruthenium triaryl phosphine complex catalyst to olefin is generally not critical and may vary widely within the scope of the invention. It may be controlled to obtain a substantially homogeneous liquid reaction mixture. Solvents are therefore not essential. However, the use of solvents which are inert, or which do not interfere to any substantial degree with the desired carbonylation reaction under the conditions employed, may be used within the scope of the invention. Liquid hydrocarbons, both saturated or aromatically unsaturated, for example, may be used as solvent in the process, as well as ketones, ethers and the like. Ratios of catalyst to olefin between about 1:1000 and above 1:50 are found to be satisfactory; higher or lower catalyst to olefin ratios may, however, be used within the scope of the invention.

A valuable aspect of the present invention resides in its ability to effect the direct single stage synthesis of methyl esters of predominantly normal aliphatic acids of 3, 5 and 7 carbon atoms from inexpensive feedstocks, ethylene and methanol. These ester products are valuable in many commercial applications, finding use as lubricants, solvents, and the like.

The process of the invention may be carried out batchwise or continuously.

The reaction mixtures obtained may be subjected to suitable catalyst and product separating means comprising one or more such steps, for example, as stratification, solvent extraction, distillation, fractionation, adsorption, etc. Catalyst, or components thereof, as well as unconverted charge, solvent, etc. may be recycled, in part or entirely, to the reaction zone.

The following examples are included to illustrate the process of the invention and are not intended to limit the invention.

TYPICAL CATALYST PREPARATION

A mixture of 15.7 g. (0.06 mole) of $RuCl_3 \cdot 3H_2O$ and 150 ml. of methanol in a Hastelloy B 300-ml. autoclave was rocked under 200–300 p.s.i. carbon monoxide pressure at 30° C. for 18 hours. In a nitrogen-filled dry box the product was filtered to remove a small amount (0.2 g.) of insoluble material. To the filtrate was added 30 g. of triphenylphosphine ($Ph_3P$) and 100 ml. of methanol and the mixture was stirred (dry box) at 60–65° C. for 3 hours. The yellow solid was collected by filtration at 25° C. and washed several times with methanol. After vacuum drying on a rotary evaporator at 1 mm. pressure, the

weighed 36 g.

The $(Ph_3P)_2Ru(CO)_2Cl_2$, 12 g. (0.185 moles) of zinc dust and 150 ml. of dimethylformamide in the above described autoclave was rocked at 100–110 C. under 300 p.s.i. carbon monoxide pressure for 20 hours. Solids were removed by filtration in the dry box. The volume of the filtrate was reduced on the rotary evaporator to 40-ml. The pale yellow crystals (8.0 g.) were collected and washed with methanol. The solids were extracted (Soxhlet) with refluxing toluene until all that remained in the thimble was some unreacted zinc dust. The volume of the toluene extract was reduced to 50-ml. The pale yellow crystals were collected and washed with methanol. The combined crystals were vacuum dried on the rotary evaporator at 30–35° C. and 1 mm. pressure. The

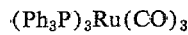

weighed 30 g. which represents a 72% overall yield. The IR spectrum in hexadeuterobenzene solution showed strong C=O absorption at 1895 cm.$^{-1}$.

*Analysis.*—Calcd. for $C_{39}H_{30}O_3P_2Ru$ (percent): C, 66.0; H, 4.26; P, 8.73; Cl, 0.0. Found (percent): C, 66.0; H, 4.40; P, 8.55; Cl, 0.1.

EXAMPLE I

A mixture of 1.05 g. (1.5 mmoles) of

8 g. (250 mmoles) of methanol and 20 g. of benzene was charged in the dry box to an 80-ml. 3800 p.s.i. pressure-tested stainless steel autoclave. After attachment of the autoclave to a manifold system, the reactor was cooled to −50° C. with Dry Ice and 16.8 g. (600 mmoles) of ethylene was added. The reactor was stirred at 225° C. for six hours and 3000–2000 p.s.i. pressure for six hours. Mass spectral analysis of exit gases showed ethylene (69%) ethane (30%) and carbon monoxide (1%).

Analysis of the yellow product mixture by gas-liquid chromatography (GLC) on a 20 ft. column packed with 15% Carbowax 20-M on Chromosorb-W at 50–200° C. showed the presence of 1.3 g. methanol (83% conversion), 0.1 g. of butane, 0.5 g. of butenes, 0.05 g. of hexenes, 0.05 g. of methyl formate, 6.9 g. (75% selectivity) of methyl propionate, 0.4 g. of diethylketone, 0.05 g. of methyl 2-methylbutyrate, 0.8 g. (8.5% selectivity) of methyl n-pentanoate, 0.1 g. of methyl n-heptanoate, and 0.05 g. each of two unknown high-boiling products. Both the methyl propionate and the methyl n-pentanoate were isolated in relatively pure forms by fractional distillation followed by GLC trapping on the above described column. The spectral properties of both compounds were almost identical with those of authentic samples. All other products were identified by comparison of their GLC retention times with those of authentic samples. The methyl n-heptanoate was also identified by its retention time on a column packed with SE-30 on Chromosorb-W.

EXAMPLE II

The experiment of Example I was repeated in a 300 ml. rocking autoclave with three times the amounts of methanol, benzene, and ethylene but the same amount of $(Ph_3P)_2Ru(CO)_3$ (8 hr. at 225° C.), the product mixture contained 10 g. of methanol (60% conversion) 16 g. of methyl propionate and 1.4 g. of methyl n-pentanoate.

EXAMPLE III

A series of experiments were conducted to demonstrate the use of other exemplary triaryl phosphine catalyst ligands. In some experiments the catalyst was prepared prior to use, in some it was prepared in situ in the reaction zone. In each experiment 1.5 mmoles of catalyst, 600 mmoles of ethylene, 250 mmoles of methanol and 20 g. of benzene solvent were stirred for six hours at a temperature of 215±5° C. at about 3000 p.s.i. pressure. The results of these experiments are given in Table I.

reduced the methanol conversion to about 20% and reduced methyl pentanoate to about 2%.

COMPARATIVE EXPERIMENTS C–F

To demonstrate the necessity of having a triaryl phosphine ligand in the catalyst a series of experiments were conducted using the following materials: $[Ru(CO)_4]_3$, $[(C_6H_{11})_3P]_2Ru(CO)_3$, $[(C_2H_5)_2PPh]_2Ru(CO)_3$, and $(Ph_3As)_2Ru(CO)_3$. In each experiment 1.5 mmoles of catalyst, 600 mmoles of ethylene, 250 mmoles of methanol and 20 g. of benzene solvent were stirred for six hours at a temperature of 215±5° C. at about 3000 p.s.i. pressure. The results of these experiments are given in Table III.

TABLE I

| Catalyst | Percent conv., CH₃OH | Selectivity, percent weight ||||||
|---|---|---|---|---|---|---|---|
| | | Methyl propionate | Methyl pentanoate | Methyl heptanoate | Diethyl ketone | Butenes | Methyl formate |
| (a) | 83 | 75 | 8.5 | 1 | 4 | 7 | 0.5 |
| (b) | 71 | 72 | 11 | 2 | 3 | 7 | 1 |
| (c) | 90 | 88 | 3 | Trace | 1 | 3 | 0.5 |
| (d) | 80 | 77 | 7 | 0.5 | 3 | 6 | 1 |

(a) $(Ph_3P)_2Ru(CO)_3$.
(b) $[(4-CF_3C_6H_4)_3P]_2Ru(CO)_3$.
(c) $[(4-CH_3OC_6H_4)_3P]_2Ru(CO)_3$.
(d) $[Ru(CO)_4]_3 + 2Ph_3P$.

EXAMPLE IV

A series of experiments were conducted to demonstrate the effect on product distribution of varying the ratio of ethylene to methanol. In each experiment 1.5 mmoles of $(Ph_3P)_2Ru(CO)_3$ was added as catalyst, and about 20 g. of benzene was used as solvent. Reaction pressure was 3000 p.s.i., temperature was 215±5° C., and reaction time was six hours. The result of these experiments are given in Table II.

TABLE II

| CH₃OH, mmoles | CH₂=CH₂/CH₃OH ratio | CH₃OH conv., percent | Selectivity, percent weight |||||
|---|---|---|---|---|---|---|---|
| | | | Methyl propionate | Methyl pentanoate | Methyl heptanoate | Butenes | Diethyl ketone |
| 500 | 1.2 | 45 | 85 | 4 | None | 4 | 1 |
| 375 | 1.6 | 60 | 81 | 6 | Trace | 5.5 | 2 |
| 250 | 2.4 | 83 | 75 | 8.5 | 1 | 7 | 4 |
| 125 | 4.8 | 90 | 72 | 10 | 2 | 8 | 5 |

COMPARATIVE EXPERIMENTS A+B

In a first experiment, a mixture of 1.05 g. (1.5 mmoles) of $(Ph_3P)_2Ru(CO)_3$, 24 g. (750 mmoles) of methanol and 60 g. of benzene was charged in the dry box to a 300 ml. 5000 p.s.i. pressure-tested stainless steel autoclave. After attachment of the autoclave to a manifold system, the reactor was cooled to −50° C. with Dry Ice and 48 g. (1700 mmoles) of ethylene was added. At 25° C. the ethylene pressure was 800 p.s.i. After the addition of 800 p.s.i. (25° C.) of carbon monoxide, the autoclave was rocked at 225° C. for 8 hours (4000 p.s.i.).

Analysis of the product mixture by gas-liquid chromatography showed 21.8 g. of methanol (9% conversion), 3.0 g. of methyl propionate, and less than 0.05 g. of methyl n-pentanoate; also present were 1.0 g. of butene and 0.3 g. of methyl formate.

In a second experiment the addition of carbon monoxide was reduced to 200 p.s.i. (25° C.). This addition

TABLE III

| Catalyst | Percent conv., CH₃OH | Selectivity, percent weight ||||||
|---|---|---|---|---|---|---|---|
| | | Methyl propionate | Methyl pentanoate | Methyl heptanoate | Diethyl ketone | Butenes | Methyl formate |
| (a) | <1 | None | None | None | None | Trace | Trace |
| (b) | 6 | 55 | ...do | ...do | ...do | 36 | 6 |
| (c) | 8 | 60 | ...do | ...do | ...do | 30 | 6 |
| (d) | 2 | 10 | ...do | ...do | ...do | 60 | 5 |

(a) $[Ru(CO)_4]_3$.
(b) $[(C_6H_{11})_3P]_2Ru(CO)_3$.
(c) $(Et_2PPh)_2Ru(CO)_3$.
(d) $(Ph_3As)_2Ru(CO)_3$.

COMPARATIVE EXPERIMENT G

To demonstrate the reaction sequence as a single reaction, 1-butene was reacted with methanol in the presence of $(Ph_3P)_2Ru(CO)_3$ catalyst at 225° C. The product distribution was about 66% methyl n-pentanoate and about 34% methyl 2-methyl butyrate, much different than seen with the process of the invention.

We claim as our invention:

1. A process for the production of methyl esters of linear alkanoic acids which comprises contacting ethylene with methanol in the presence of not more than about 10 percent carbon monoxide at a temperature of from about 175° C. to about 250° C., a reaction pressure of from about 1000 p.s.i.g. to about 5000 p.s.i.g. and a molar ratio of ethylene to methanol of from about 0.75 to 1 to about 10 to 1 in the presence of a complex catalyst consisting essentially of ruthenium in complex combination with carbon monoxide and a triarylphosphine represented by the empirical formula $(R_3P)_2Ru(CO)_3$ wherein R is an aryl or alkaryl group of from 6 to 9 carbon atoms, thereby carbomethoxylating said ethylene either as ethylene or as ethylene growth product having 4 to 6 carbon atoms with the formation of methyl esters of acids having one more carbon atom than said ethylene or ethylene growth product.

2. The process in accordance with claim 1 wherein R is phenyl.

3. The process in accordance with claim 1 wherein R is p-methylphenyl or p-ethylphenyl.

4. The process in accordance with claim 3 wherein R is p-methylphenyl.

5. The process in accordance with claim 1 wherein R is p-(haloalkyl)phenyl of from 7 to about 8 carbon atoms.

6. The process in accordance with claim 5 wherein R is p-(fluoromethyl)phenyl.

7. The process in accordance with claim 6 wherein R is p-(trifluoromethyl)phenyl.

8. The process in accordance with claim 1 wherein R is p-methoxyphenyl.

References Cited

UNITED STATES PATENTS 3,437,676  4/1969  Kutepow et al. __ 260—497 AX

OTHER REFERENCES

March, Adv. Org. Chem.: RXs, Mech., & Structure, McGraw-Hill (1968), pp. 608–609.

LORRAINE A. WEINBERGER, Primary Examiner

R. D. KELLY, Assistant Examiner.